(No Model.)  2 Sheets—Sheet 1.

J. C. BURKE.
TIMEPIECE.

No. 604,297. Patented May 17, 1898.

WITNESSES
James T. Duhamel
J. L. Tappan

INVENTOR
John C. Burke.
by John Wedderburn
Attorney (No Model.)  J. C. BURKE.  2 Sheets—Sheet 2.
TIMEPIECE.

No. 604,297.  Patented May 17, 1898.

WITNESSES
James F. Duhamel
J. Le Tappan

INVENTOR
John C. Burke
by John Wedderburn
Attorney

UNITED STATES PATENT OFFICE.

JOHN C. BURKE, OF MIDDLESBOROUGH, KENTUCKY.

TIMEPIECE.

SPECIFICATION forming part of Letters Patent No. 604,297, dated May 17, 1898.

Application filed August 21, 1896. Serial No. 603,507. (No model.)

*To all whom it may concern:*

Be it known that I, JOHN C. BURKE, a citizen of the United States, residing at Middlesborough, in the county of Bell and State of Kentucky, have invented certain new and useful Improvements in Timepieces; and I do hereby declare the following to be a full, clear, and exact description of the invention, such as will enable others skilled in the art to which it appertains to make and use the same.

My invention relates to certain new and useful improvements in timepieces, the objects of the same being to improve the construction, to divide the different mechanisms into separate trains, and to mount the same separately in separate bearings in order that they may be independently removed, repaired, and replaced; also, to provide in a single instrument mechanism for indicating mean solar time in the eastern, central, mountain or western, and Pacific time-sections of this country, similar mechanism for indicating the seconds in the different time-sections, suitable striking mechanism which is adapted to strike at each hour and half-hour, mechanism for indicating the days of the week, similar mechanism for indicating the days of the month, mechanism for indicating the month of the year, mechanism for indicating the year, mechanism for indicating the times of the rising and setting of the sun, and mechanism for indicating the phases of the moon.

The invention also consists in other details of construction and combinations of parts, which will be hereinafter more fully described and claimed.

Figure 2:
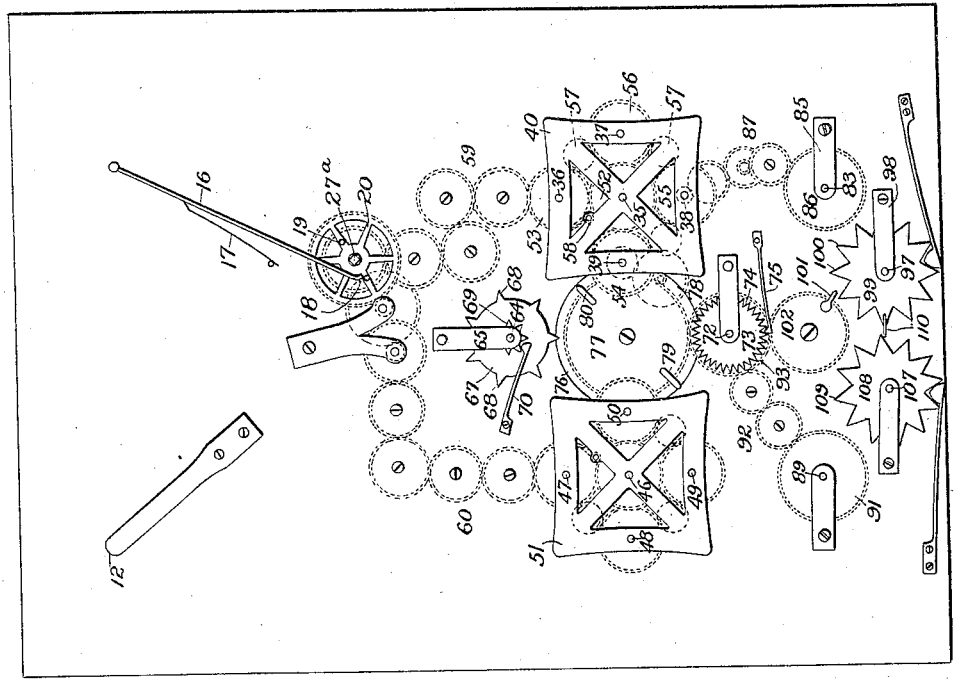
Figure 1:
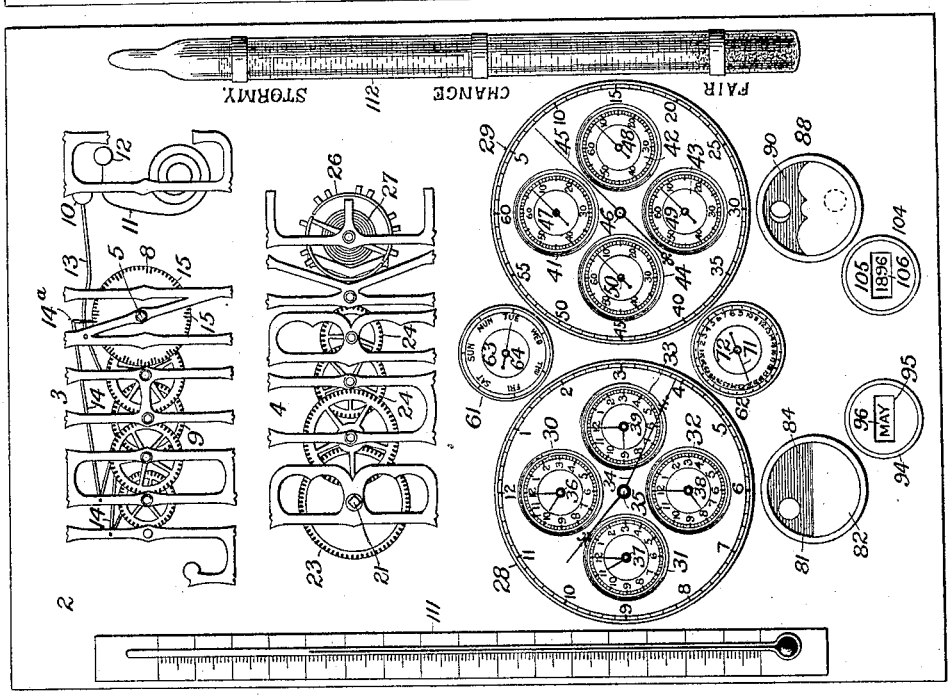
Figure 3:
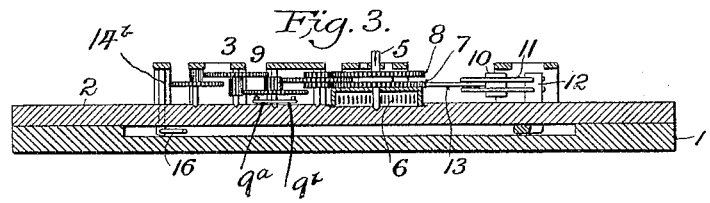
Figure 4:
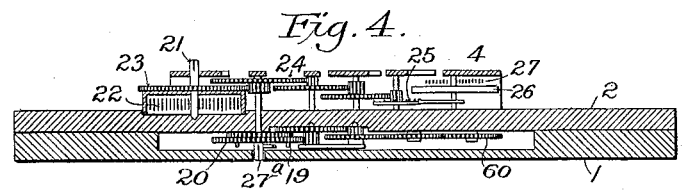
Figure 5:
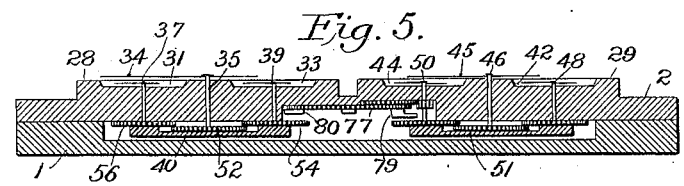
Figure 6:
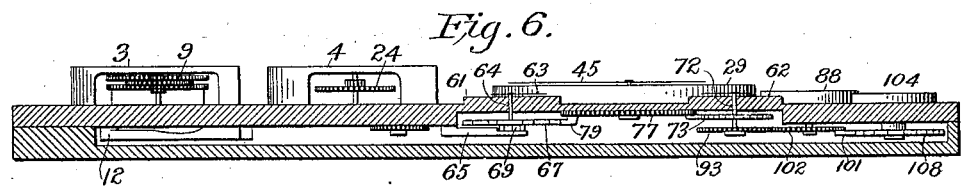
Figure 7:
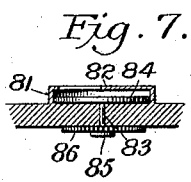

In the drawings forming part of this specification, Figure 1 represents a face view of my instrument. Fig. 2 is a view of the under side of the face-plate on which the different operative mechanisms are mounted. Fig. 3 is a sectional view through the striking or alarm mechanism. Fig. 4 is a similar view through the main driving mechanism. Fig. 5 is a sectional view through the two dials for indicating solar time. Fig. 6 is a central longitudinal section through the device. Fig. 7 is a sectional view through the dial for indicating the rising and setting of the sun.

Like reference-numerals indicate like parts in the different views.

My improved device is made up of a casing consisting of a base-plate 1 and a face-plate 2. On the face-plate 2 all of the operative parts of my device are mounted. On the top surface of the plate 2 are supports 3 4, which, as shown in the drawings, are made in the form of my own name for ornamental purposes. This, however, is a mere detail, as any form of support may be employed.

Mounted upon one of the supports 3 is a main winding-shaft 5 for the striking mechanism, upon which is secured a driving or motor spring 6 and two cog-wheels 7 8, which operate, in connection with a train of gearing 9, to operate the striking-hammer 10, which is arranged to strike a gong 11, mounted on a post 12, rising from the plate 2. The striking-hammer 10 is secured to the outer end of a rod or bar 13, which is pivoted in the plate 2 and in one of the supports 3, and mounted upon the shaft of one of the pinions of the gearing 9 is a disk $9^a$, which is provided at diametrically opposite points with studs or pins $9^b$, and it will be noted that the end of the lever 13 which is opposite to the hammer 10 lies in the path of the studs or pins $9^b$, so that as the disk $9^a$ rotates said studs or pins will contact with said end of the lever 13 and cause the hammer 10 to strike the alarm-spring 11. A series of supplemental bars 14 14 are also arranged within the supports 3 adjacent to the gearing 9, and one of said bars 14 is provided with a flange or projection $14^a$ upon its forward end, which acts in engagement with the teeth on the upper cog-wheel 8 for the purpose of actuating the alarm the proper number of times, while the other bar 14 is rigidly secured to a spindle $14^b$, which extends through the face-plate 2 and has its lower end projecting below the inner face of said plate. The said cog-wheel 8 has a series of small teeth thereon arranged in sets numbering from one up to twelve, the different sets being separated by deep notches 15 15, as clearly shown. During the rotation of the wheel 8 the flange or arm $14^a$ enters the notches or recesses between said teeth and permits the alarm-hammer 10 to vibrate once for each tooth that is passed. When said flange or arm becomes seated in one of the deep notches 15, however, it is locked and prevents further rotation of the wheel 8 until lifted out of the same. The bar 14 to which the flange or arm $14^a$ is connected is released by a lever 16 on the under side of the plate 1, which is secured to the spindle 14$^b$, upon which one of the bars 14 is rigidly mounted. This lever is normally urged downwardly by means of a spring 17 and is formed with a hook or arm 18 on its lower end, which is adapted to be engaged by oppositely-disposed pins or projections 19 on one of the wheels 20, forming a part of the running-gear of the clock. When said lever is tripped, the flange 14$^a$ is thrown out of engagement with the deep notch 15 into which it is seated through the medium of the bar 14 which is connected to the spindle 14$^b$, and the wheel 8 is adapted to turn the distance between the notch 15 in which said arm was seated and the next deep notch. It will be seen that the notches 15 are arranged in pairs, so that upon the half-hours the movement of the wheel 8 will be through an arc the length of the distance between two teeth on said disk. At the full hours, however, the rotation of said wheel will be great or little, according to the number of small teeth between the two deep notches 15. As stated, these small teeth run in numbers from one up to twelve, and each time the arm 14$^a$ drops into one of the notches between the small teeth a stroke is given by the hammer 10 upon the gong 11.

Upon the face-plate 4 is mounted the running-gear of the clock mechanism proper. This is made up of a winding-shaft 21, having the mainspring 22, connected thereto, and a cog-wheel 23, also secured thereto above the winding-drum. A train of gearing 24 is driven by the cog-wheel 23 and is controlled by an escapement-wheel 25 at one end of the train of gearing, which acts in connection with the balance-wheel 26, having a hair-spring 27 attached thereto. The gear-wheel 24, which lies directly adjacent to the cog-wheel 23, has its spindle 27$^a$ projecting through to the under side of the plate 2, and on this spindle 27$^a$ is mounted the tripping-wheel 20, heretofore referred to. On the top face of the plate 2 are two dials 28 and 29, respectively, the dial 28 having around its outer edge numbers ranging from "1" to "12" for indicating hours. Located within the main dial 28 are four small dials 30, 31, 32, and 33 for indicating time on different meridians. The dial 28 has hour and minute hands 34, mounted upon a central shaft 35, passing through to the under side of the plate 2, and the dials 30, 31, 32, and 33 have hour and minute hands mounted upon central shafts 36, 37, 38, and 39, respectively, which likewise project through to the under side of the plate 2, the said hand-shafts having bearings in a rectangular bracket-plate 40, secured to the under side of the plate 2. The dial 29 is graduated around its outer edge after the manner of the usual seconds-hand dials of watches and has within it four smaller dials 41, 42, 43, and 44 for indicating seconds. The dial 29 has the usual hand or pointer 45, mounted upon the outer end of a shaft 46, which projects through to the under side of the plate 1, and the dials 41, 42, 43, and 44 are provided with similar hands or pointers which are secured to the upper ends of similar shafts 47, 48, 49, and 50, which extend through to the under side of the plate 2, the said hand-shafts having bearings in a rectangular bracket-plate 51, similar in all respects to the plate 40. The shaft 35 has secured to the lower end thereof a gear 52, and the shafts 36, 37, 38, and 39 have connected to their lower ends similar gears 53, 54, 55, and 56, all of the same size and geared with one another through the intermediate idle-pinions 57 57, so that they are all adapted to rotate in unison in the same direction. The gear 52 drives the gear 53 through an interposed pinion 58 of small dimensions. The train of gearing made up of the gears 52, 53, 54, 55, 56, 57, and 58 meshes with the gear 20 through the interposed train of gearing 59 of the same size as the gears 52, 53, 54, 55, and 56. By this construction power is transmitted from the motor-spring 22, through the gears 23 24, shaft 27$^a$, train of gearing 59, to turn the minute and hour hands on the dials 28, 30, 31, 32, and 33 at a uniform rate of speed in the same direction. The lower ends of the shafts 46, 47, 48, 49, and 50 are provided with intergearing cog-wheels and pinions similar in all respects to the pinions 52, 53, 54, 55, 56, 57, and 58 for the purpose of rotating the second-hands on the dials 29, 41, 42, 43, and 44 in unison in the same direction. A train of gearing 60, similar to the train of gearing 59, connects the same with the gear 20. On the front face of the plate 2 is a dial 61 for indicating the different days of the week. A similar dial 62 for indicating the day of the month is also provided, the same being located directly beneath the dial 61. A hand or pointer 63 is provided for the dial 61, which is mounted upon the outer end of a shaft 64, which projects through the plate 2 and has bearings in a bracket-arm 65 on the under side of said plate. Secured to said shaft is a disk or wheel 67, having seven radially-extending teeth 68 thereon. A smaller seven-toothed stop-disk 69, secured to said shaft, is engaged by a spring 70, secured to the under side of the plate 2, for stopping the rotation of the shaft 64 at regular intervals. A hand or pointer 71 is provided for the dial 62, which is secured to the outer end of a shaft 72, which extends through to the under side of the plate 2 and is mounted in suitable bearings on the under side thereof. The said shaft 72 has secured to it a disk or wheel 73, having thirty-one notches or teeth 74 thereon. The said teeth are engaged by a spring 75, which is secured to the under face of the plate 2, for stopping the wheel 73 at regular intervals. Located in a socket or recess 76 on the under side of the plate 2, between the wheels or disks 73 and 67 and between the rectangular supporting-plates 51 and 40, is a cog-wheel 77, which is mounted to rotate upon a suitable shaft and adapted to make a complete revolution once in twenty-four hours through a suitable train of gearing 78, operated directly from the pinion 54. The said cog-wheel 77 has connected to its lower face, at diametrically opposite points thereon, projecting lugs or arms 79 and 80, the said arm 79 being adapted to engage the teeth on the disk or wheel 67 and the arm 80 adapted to engage the teeth on the disk or wheel 73. It will be noted, however, that the arms or projections 79 and 80 are arranged in different planes upon the cog-wheel 77 and that the wheels 67 and 73 are also arranged in different planes. By reason of this construction it will be seen that the arm 79 is adapted to engage the teeth of the wheel 67, but be free from engagement with those of the wheel 73, while the arm 80 is adapted to engage the teeth of the wheel 73, but be free from engagement with the teeth of the wheel 67 during the rotation of the wheel 77, and hence it is obvious that each one of said wheels 67 and 73 will only be rotated the distance equal to one of the teeth of each of the same when the wheel 77 has made a complete rotation, the arms 79 and 80 only engaging their respective wheels. By this construction it will be seen that once in every twenty-four hours the disks or wheels 67 and 73 will be rotated the distance between two of the teeth thereon, shifting the hands or pointers 63 and 71, so as to indicate the next succeeding day of the week and the succeeding day of the month. Located directly beneath the dial 28 is a dial 81 for indicating the rising and setting of the sun. This dial is open at its upper side and is closed at its lower side by leaving above said plate a semicircular opening. Rotatably mounted upon a suitable shaft 83 is a disk 84, upon which is represented the sun. The said shaft 83 projects through to the under side of the plate 2 and has bearing in an arm 85, secured thereto. Said shaft also has secured to it a gear-wheel 86, which meshes, through suitable intermediate gearing 87, with the gear 55, heretofore referred to. By this construction it will be seen that as the hands of the dial 28 are rotated the motion will be transmitted to rotate the disk 84 on the shaft 83. The representation of the sun on said disk 84, therefore, will be exposed above the top of the plate 82, which represents the horizon at the time the sun rises upon any certain specified day, and the same will disappear beneath said plate at the time of the setting of the sun for the same day. The plate 82 is adapted to be moved upwardly or downwardly to decrease or increase the exposed or open portion of the dial 81, so as to permit the indication of the proper time for the rising and setting of the sun for the different days of the year as said days lengthen or shorten.

Located beneath the dial 29 is a dial 88, whose upper side is open, as clearly shown. Rotatably mounted upon a shaft 89, which projects through to the under side of the plate 2, is a disk 90, having a representation of two moons at diametrically opposite points thereon. The said disk 90 is adapted to make a complete rotation once in twenty-nine and one-half days. The shaft 89, upon which said disk is mounted, has a gear-wheel 91 upon its lower end, which meshes, through a suitable train of gearing 92, with a gear 93 upon the lower end of the shaft 72. The shaft 72, it will be remembered, is the one upon which the disk 73 and the hands 71 are mounted, by means of which the days of the months are indicated upon the dial 62.

Just beneath the sun-dial is a dial 94 for indicating the different months of the year. This dial has a rectangular opening 95 therein, through which is seen a disk or wheel 96, having the names of the twelve months of the year printed upon its surface. The said disk 96 is mounted upon a suitable shaft 97, which projects through to the under side of the plate 2 and has bearings in an arm 98, secured to the under side of the plate 2. The said shaft has secured to it a disk or wheel 99, having twelve radially-extending teeth 100 thereon. These teeth are adapted to be engaged by an arm or projection 101 on the lower face of a gear 102, which is of the same diameter as and meshes with the gear 93 on the shaft 72, on which the wheel 73 is also mounted. It will be remembered that the disk 73 will make a complete rotation once in thirty-one days, or one month. The gear 102, which is of the same diameter, and consequently moves at the same rate of speed, will therefore make its complete rotation once in thirty-one days. The arm 101 will therefore engage one of the teeth 100 and shift the disk 96 once a month, exposing the name of a different month through the opening 95 in the dial 94.

Located directly beneath the moon-dial 88 is a dial 104 for indicating different years. The said dial has a rectanugular opening 105 therein, through which are visible the different years, which are printed in succession on the top face of a disk 106. The said disk 106 is secured to the upper end of a shaft 107, which projects through to the under side of the plate 2 and has a disk or wheel 108 thereon having a series of radially-extending teeth 109 of a number equal to the number of the different years printed upon the disk 106. The teeth 109 are adapted to be engaged by an arm or projection 110 on the disk or wheel 99, so that once during each revolution of the disk 99, which occurs every twelve months, the disk 106 will be rotated the distance between two dates thereon for exposing a different year through the opening 105 in the dial 104. In connection with the mechanism heretofore described I may secure to the front face of the plate 2, on one side thereof, a thermometer 111 and upon the opposite side thereof a barometer 112, the same being of ordinary form of construction and for the usual purpose.

From the foregoing description it will be seen that I have provided clock mechanism for indicating the time in hours, minutes, and seconds in the different time-sections of this country, alarm mechanism for striking the hours and half-hours, mechanism for indicating the year, the month, the days of the month, and the days of the week, mechanism for indicating the time of the rising and setting of the sun, and mechanism for indicating the different phases of the moon, all operated from a single mainspring or driving-motor.

Having now described my invention, what I claim as new, and desire to secure by Letters Patent, is—

1. In a timepiece, the combination with the driving and time-indicating mechanism, of a calendar mechanism comprehending dials and hands or pointers for indicating the days of the week and the days of the month, toothed wheels mounted on the arbors of said hands, one of said wheels having teeth corresponding in number with the days in a week, and the other having teeth corresponding in number with the days in a month, a wheel located between said toothed wheels and geared with the driving and time-indicating mechanism to make one rotation in twenty-four hours, and carrying two tappet-arms one of which engages and operates one of said toothed wheels, and the other arm the other of said wheels, a month-indicating disk, a toothed wheel for operating the same, a year-indicating disk, a toothed wheel for operating the same, connections between the wheels having teeth corresponding in number with the days of the month and the said wheels for operating the month and year indicating disks, a sun-dial, a moon-dial, toothed wheels for operating the same, and connections between the driving mechanism and the last-mentioned toothed wheels, whereby the said hands or pointers are each advanced one step at each rotation of said tappet-wheel.

2. In a timepiece, the combination with the driving and time-indicating mechanism, of a calendar mechanism comprehending four dials and rotary indicators operating in connection therewith to indicate, respectively the day of the week, the day of the month, the month, and the year, of a tappet-wheel geared with the time mechanism to make one rotation in twenty-four hours, the tappet-arms thereof standing in different planes of rotation, toothed wheels mounted on the arbors or spindles of the indicator for the day of the week and the day of the month, adapted to be operated by the respective tappet-arms, a toothed wheel on the arbor or spindle of the year-indicator, and a twelve-toothed wheel on the arbor of the month-indicator, the last-named wheel having a tappet to operate the toothed wheel of the year-indicator, a tappet-wheel geared, and rotating synchronously, with the first-named tappet-wheel to operate the month-indicator, a sun-dial, a moon-dial, toothed wheels for operating the same, and connections between the driving mechanism and the last-mentioned wheels, all operating together as and for the purpose set forth.

3. In a timepiece, the combination with the main driving mechanism, of a dial for indicating mean solar time having a hand or pointer centrally mounted upon a suitable shaft, a series of smaller supplemental dials for indicating the time in different time-sections, hands or pointers for each of said supplemental dials mounted upon suitable shafts, pinions upon the lower ends of said shafts meshing with one another through suitable intermediate pinions, a train of gearing for rotating said hands in the same direction and at the same speed directly from said main driving mechanism, a dial for indicating the days of the month, a hand or pointer therefor, a shaft upon which said hand or pointer is mounted, a disk or wheel secured to said shaft having a series of thirty-one radially-extending teeth thereon, a cog-wheel meshing with one of the pinions on the lower end of the shaft upon which the hands of the solar disk are mounted, so geared as to make a complete rotation once in twenty-four hours, a projecting lug or arm on said cog-wheel adapted to engage said disk once during each complete revolution thereof, a circular dial-plate for indicating the different months of the year, having the names of said months printed or otherwise impressed upon the upper surface of said plate adjacent to its outer edge adapted to be visible one at a time through an opening in the face-plate of the device, a shaft upon which said plate is mounted, a disk or wheel having a series of twelve teeth thereon secured to said shaft, an idle-pinion meshing with a similar pinion of the same size on the shaft to which said thirty-one-toothed disk is mounted, an arm or projection on said idle-pinion adapted to engage the twelve-toothed disk once during each revolution of said idle-pinion, a dial for indicating different years, having printed or otherwise impressed upon the upper surface thereof adjacent to its outer edge different years in succession, capable of being visible one at a time through a second opening in the face-plate of the device, a shaft upon which said dial-plate is mounted, a disk having a series of teeth thereon equal in number to the number of different years printed upon said dial-plate, and a lug or projection on said twelve-toothed disk adapted to engage one of the teeth on the toothed disk connected to said year dial-plate once during each revolution of the former, substantially as and for the purpose described.

In testimony whereof I have signed this specification in the presence of two subscribing witnesses.

JOHN C. BURKE.

Witnesses:
C. A. RYAN,
J. E. VOWELS.